March 2, 1954     H. HILTEBRAND     2,670,766
SECTIONAL CIRCULAR SAW
Filed Sept. 26, 1952
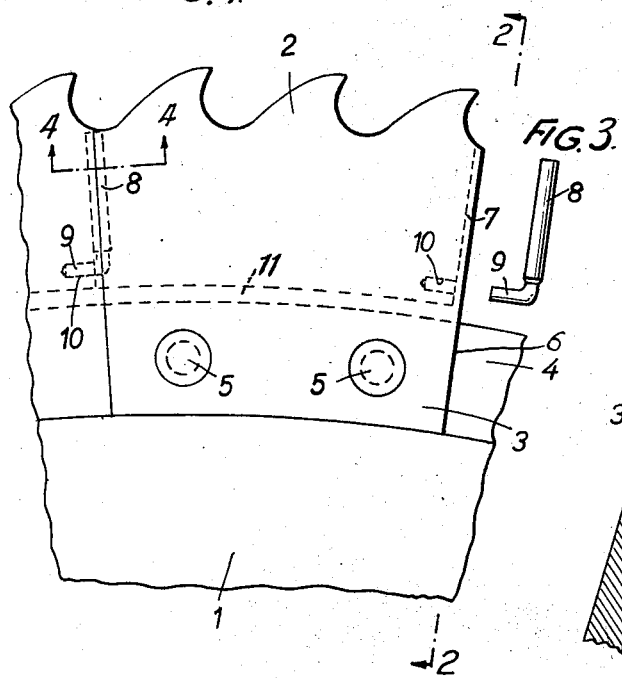
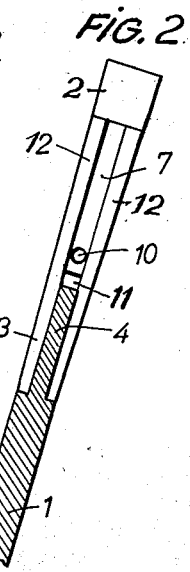
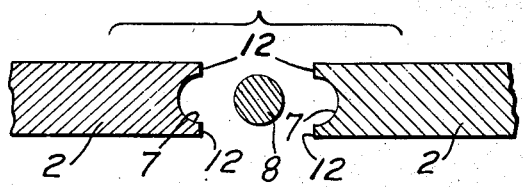
INVENTOR.
Heinrich Hiltebrand
BY Emery Booth Townsend
Miller & Needner
Att'ys Patented Mar. 2, 1954

2,670,766

UNITED STATES PATENT OFFICE 2,670,766

SECTIONAL CIRCULAR SAW

Heinrich Hiltebrand, Bulach, Switzerland, assignor to Lennartz & Co., Bulach (Zurich), Switzerland Application September 26, 1952, Serial No. 311,655

Claims priority, application Switzerland September 27, 1951

3 Claims. (Cl. 143—139)

This invention relates to a circular saw of the type comprising a saw disc to which is fixed a ring-like portion formed of arcuate sections and provided with radially extended saw teeth at its outer periphery.

The primary object of the invention is to provide improved means for interlocking the abutting edges of adjacent arcuate sections to securely hold them against lateral displacement and to increase the stability of the toothed ring-like portion.

The invention consists in certain novel features of construction and combination of parts as hereinafter pointed out and illustrated in the accompanying drawings showing preferred embodiments of my invention.

In the drawings,

Fig. 1 is a fragmentary view in elevation of a circular saw;

Fig. 2 is a section on the line 2—2 of Fig. 1;

Fig. 3 is an elevation of an interbracing member for the sections carrying the saw teeth; and Fig. 4 is an exploded view corresponding to a section on the line 4—4 of Fig. 1.

As represented in the drawings, the circular saw comprises a saw disc 1 and an annular portion formed of abutting arcuate sections 2 provided with radially extending saw teeth. The saw disc 1 has a peripheral rib 4 of reduced thickness to which the arcuate sections 2 are fixed by means of rivets 5. The sections 2 are tapering toward each other as they extend radially inwards from the saw teeth so that the sections are thickest at the outer peripheral portions. Each section is provided with a slot extending inwardly from the inner edge thereof so as to form two leg portions 3 straddling said peripheral rib 4 of the saw disc 1. The radial width of the slot is slightly greater than the radial width of the rib 4 so as to leave an annular space 11 between the outer edge of the rib 4 and the bottom of the slot in the sections 2.

The opposite facing end edges 6 of the sections 2 are situated in planes positioned radially of the saw disc. Both edges are provided with a radial groove 7 of approximately semi-circular cross-section. The groove 7 extends the whole length of the edge 6 from the outer peripheral edge of the section 2 to said intermediate space 11. The groove is positioned intermediate the opposite faces of the section 2 so as to provide at opposite sides of the groove two flat surfaces 12 of material extending substantially the full length of the groove. The two flat surfaces 12 of the end edge of a section 2 are in the same plane and are facing the corresponding flat surfaces on the adjacent end edge of the next following section, so that the two grooves 7 form an opening of approximately circular cross-section. A steel pin 8 is inserted into this opening and is formed at its inner end with an extension 9 of slightly smaller diameter and bent over at right angles. The extension 9 is inserted in a hole 10 extending inwardly from the groove 7 at the end edge of a section 2. The extension 9 prevents the pin 8 from being projected out of its lodgment between two adjacent sections 2 by the action of centrifugal force. The hole 10 can be precisely bored to fit the extension 9 and to maintain the pin 8 in an exactly predetermined position.

In manufacturing the saw tooth sections they are cut and shaped from blanks which are afterward heat treated for hardening them. This hardening operation, as is well known, more or less deforms the sections by reason of internal stresses set up by the heat treatment. Consequently, after the hardening operation the segments must be subjected to a grinding operation to correct this deformation and accurately shape them, and particularly the contacting end surfaces of adjacent sections. Since these end surfaces 12 are straight flat surfaces and the surface on one side of the groove 7 in each section is in the same plane as the surface on the opposite side of the groove, the grinding operation for shaping these flat surfaces is a very simple one readily performed with the ordinary grinding machine.

By making the depth of the grooves 7 slightly greater than the radius of the pin 8, the flat surfaces 12 may be ground off a predetermined extent to make the pins accurately fit the openings formed by the grooves of abutting sections.

What I claim is:

1. A circular saw comprising a saw disc formed with a peripheral rib of reduced thickness, an annular portion formed of abutting arcuate sections each carrying saw teeth at its outer edge, said sections being formed with recesses extending inwardly from their inner edges for receiving said rib, means securing to said rib the portions of said sections having said recesses, the opposite end edges of said sections each having a groove extending lengthwise thereof and opening on the outer edge of the section, which groove is positioned intermediate the opposite faces of the section to provide at each of opposite sides of said groove a flat surface of material width extending for the full length of the groove, which flat surfaces are in the same plane and abut the corresponding flat surfaces of adjacent sections, each groove cooperating with the adjacent groove of the adjacent section to form an opening extending radially of said annular portion from its outer edge, each section having one end edge thereof provided with a preformed recess extending laterally of and communicating with said groove in said edge, and a pin in each of said openings formed by said grooves for interbracing said sections, said pin having a laterally extending portion engaged in said recess of said end edge for precisely locating said pin in said opening and for securing it against removal therefrom.

2. A circular saw comprising a saw disc, an annular portion formed of abutting arcuate sections each carrying saw teeth at its outer edge, said sections having slots extending inwardly from their inner edges intermediate their faces for receiving said saw disc, means securing to said disc the portions of said sections at opposite sides of said slots, the opposite end edges of said sections each having a groove extending lengthwise thereof from the outer edge of the section to the bottom of the slot in the section, which groove is positioned intermediate the opposite faces of the section to provide at each of opposite sides of said groove a flat surface of material width extending for the full length of the groove, which flat surfaces are in the same plane and abut the corresponding flat surfaces of adjacent sections, the grooves being approximately semi-circular in transverse cross-section and each cooperating with the adjacent groove of the adjacent section to form an opening of approximately circular cross-section, each section having one end edge thereof provided with a preformed recess extending laterally of and communicating with said groove in said edge in proximity to the inner end of the groove, and a pin in each of said openings formed by said grooves for interbracing said sections, each pin having a laterally extending portion engaged in said recess in the end edge of each section for precisely locating and securing said pin in said opening.

3. A circular saw comprising a saw disc formed with a peripheral rib of reduced thickness, an annular portion formed of abutting arcuate sections each carrying saw teeth at its outer edge, said sections having slots extending inwardly from their inner edges intermediate their faces for receiving said rib, said slots having such radial depth as to provide an annular space between the outer edge of said peripheral rib and the bottom of the slot, means for securing to said rib the portions of said sections at opposite sides of said slots, the opposite end edges of said sections each having a groove extending lengthwise thereof from the outer edge of the section to the bottom of the slot in the section, which groove is positioned intermediate the opposite faces of the section to provide at each of opposite sides of said groove a flat surface of material width extending for the full length of the groove, which flat surfaces are in the same plane and abut the corresponding flat surfaces of adjacent sections, the grooves being approximately semi-circular in transverse cross-section and each cooperating with the groove of an adjacent section to form an opening of approximately circular cross-section in alignment with said rib of the saw disc, each section having one end edge thereof provided with a hole extending inwardly from said groove in proximity to the inner end of the groove, and a pin in each of said openings for interbracing said sections, said pin having an extension of reduced diameter at the inner end thereof bent over at substantially right angles to the pin and engaged in said hole in the end edge of each section for precisely locating and securing said pin in said opening.

HEINRICH HILTEBRAND.

References Cited in the file of this patent

UNITED STATES PATENTS

| Number | Name | Date |
|---|---|---|
| 1,788,456 | Eckersley | Jan. 13, 1931 |

FOREIGN PATENTS

| Number | Country | Date |
|---|---|---|
| 466,860 | Great Britain | June 7, 1937 |
| 277,080 | Switzerland | Nov. 1, 1951 |